United States Patent [19]

Gerkey

[11] 4,195,411
[45] Apr. 1, 1980

[54] REMOTE GAGING APPARATUS

[75] Inventor: Kenneth S. Gerkey, Mt. Lebanon, Pa.

[73] Assignee: Westinghouse Electric Corp., Pittsburgh, Pa.

[21] Appl. No.: 900,039

[22] Filed: Apr. 25, 1978

[51] Int. Cl.² .............................................. G01B 5/00
[52] U.S. Cl. ................................. 33/143 L; 33/172 E
[58] Field of Search ..................... 176/19 R; 33/169 B, 33/172 L, 143 L, 169 R, 174 L

[56] References Cited

U.S. PATENT DOCUMENTS

| | | | |
|---|---|---|---|
| 3,107,432 | 10/1963 | Dickinson et al. | 33/143 L |
| 3,967,382 | 7/1976 | Johnson et al. | 33/174 L |
| 4,070,240 | 1/1978 | Kugler | 176/66 |

Primary Examiner—Harry N. Haroian
Attorney, Agent, or Firm—L. A. DePaul; Z. L. Dermer

[57] ABSTRACT

A remote gaging apparatus for remotely measuring the pellet stack length and plenum length within a nuclear reactor fuel element comprises a housing capable of having a nuclear fuel element inserted therein with a drive mechanism disposed in the housing and attached to a rod having a stop mounted on the rod for selectively inserting the rod into an open end of the nuclear fuel element. The remote gaging apparatus further comprises a measuring device disposed in the housing and associated with the stop for contacting the stop when the rod is inserted into the fuel element thereby measuring the length of insertion of the rod in the fuel element. By determining the length of insertion of the rod in the fuel element, the stack length of nuclear fuel pellets in the fuel element can be determined along with the length of the unfilled plenum of the nuclear fuel element.

7 Claims, 5 Drawing Figures

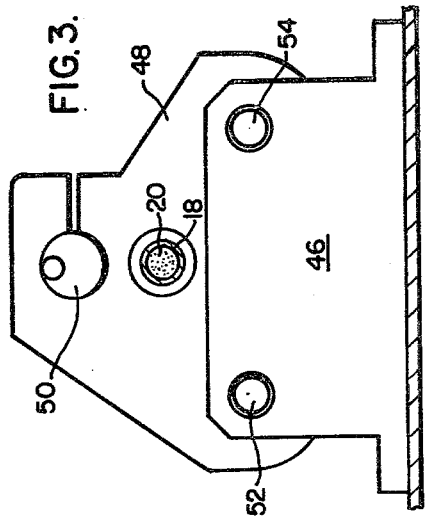
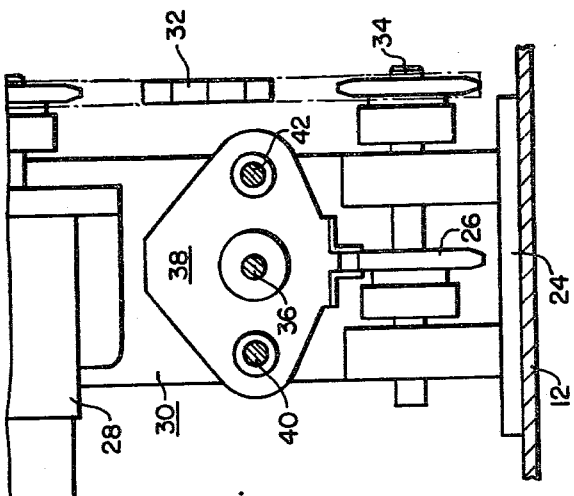
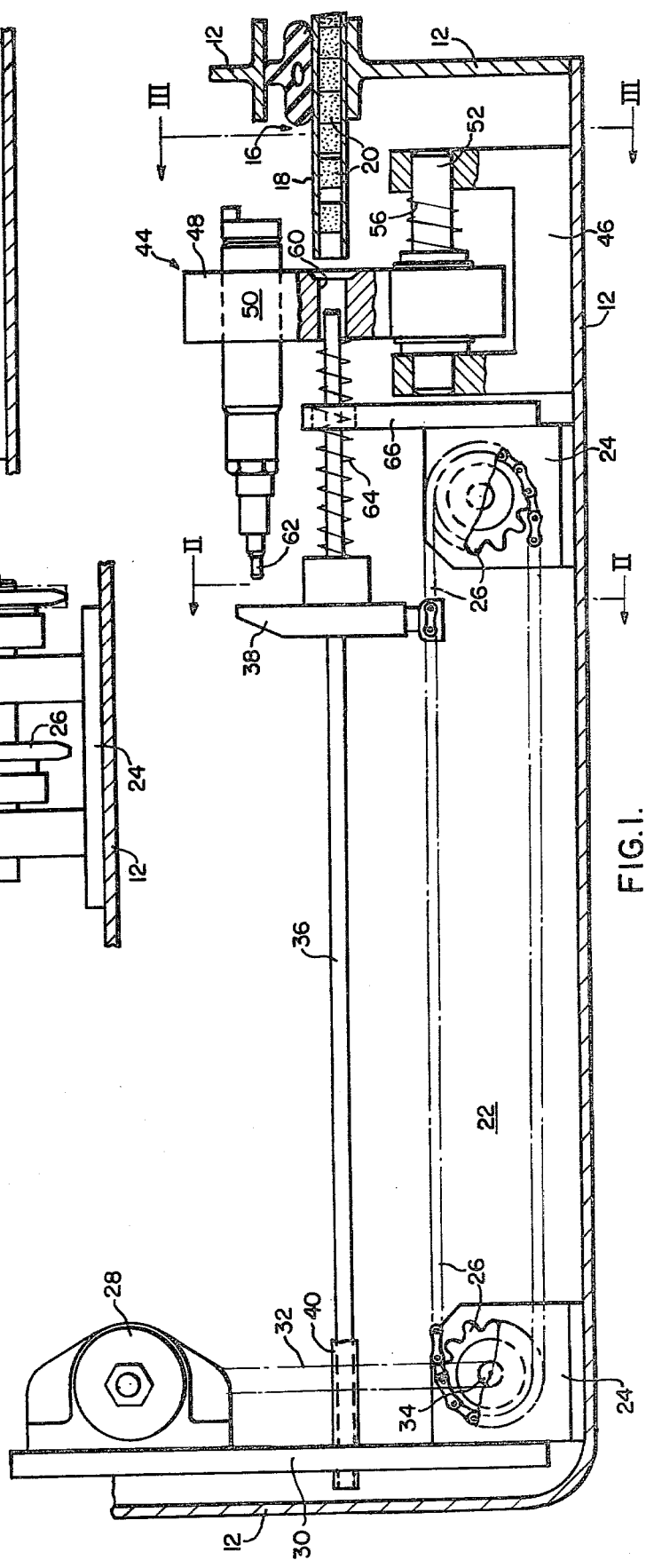

REMOTE GAGING APPARATUS

BACKGROUND OF THE INVENTION

This invention relates to remote gaging apparatus and particularly to remote gaging apparatus for use with nuclear fuel elements.

In many designs of nuclear reactors, the reactor vessel has an inlet and an outlet for circulation of a coolant in heat transfer relationship with a core contained therein that produces heat. The core comprises an array or arrays of fuel assemblies which contain nuclear fuel elements. The nuclear fuel element is generally a cylindrical metallic sheath sealed at both ends containing nuclear fuel pellets. The nuclear fuel pellets may be, for example, ceramic fuel pellets of a uranium compound which is stacked in the fuel elements. During reactor operation, the nuclear fuel pellets fission releasing fission products such as fission gas while generating heat in a manner well known in the art. The reactor coolant absorbs the heat while circulating through the core thereby cooling the fuel elements of the core and heating the coolant. Of course, the heated coolant may then be used to produce power in a conventional manner.

There are several methods known in the art for loading uranium fuel pellets into the cylindrical metallic sheath for use in a light water reactor. One such method comprises simply placing the fuel pellets in the metallic sheath by hand. This method is possible because non-irradiated uranium fuel does not pose serious radiological problems to working personnel. However, when the nuclear fuel utilized is of a more toxic nature such as plutonium or a reprocessed uranium compound, then increased safeguards must be employed to prevent releasing radioactive contaminants to the atmosphere and to prevent over exposing working personnel. When such a toxic fuel is employed, it is known in the art to use glove-box handling techniques to load the fuel pellets into the metallic sheath.

Typical glove-box handling procedure first requires transferring the nuclear fuel pellets in a sealed container into the glove box and then firmly sealing the glove box. Once placed in the glove box, the sealed container may then be opened by manual gloved manipulation. The fuel pellets may then be loaded into a metallic sheath either totally enclosed within the glove box, or with its open end sealed into a glove box through a plastic membrane. During the loading of the metallic sheath with the fuel pellets, it is important to be able to determine the amount of fuel pellets in each fuel element so that a specific reactivity associated with each fuel element is maintained. When the loading of the metallic sheath with the nuclear fuel pellets is performed manually at a low production level, the measurement of the amount of fuel pellets in each fuel element can be performed manually. However, when it is necessary to load fuel pellets into fuel elements at a mass production level, manual measurement of the amount of fuel pellets in each fuel element is not acceptable. Therefore, what is needed is a remote gaging apparatus for remotely measuring the fuel pellet stack length within a nuclear fuel element without manual supervision.

SUMMARY OF THE INVENTION

A remote gaging apparatus for remotely measuring the pellet stack length and plenum length within a nuclear reactor fuel element comprises a housing capable of having a nuclear fuel element inserted therein with a drive mechanism mounted in the housing and attached to a rod having a stop mounted thereon for selectively inserting the rod into the open end of a fuel element thereby contacting the nuclear fuel pellets in the fuel element and causing the fuel pellets to become tightly packed in the fuel element. The apparatus further comprises a measuring device disposed in the housing and associated with the stop for contacting the stop when the rod is inserted into the fuel element thereby measuring the length of insertion of the rod into the fuel element. By remotely determining the length of insertion of the rod in the fuel element, the total length of fuel pellets in the fuel element may be automatically determined.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

FIG. 1 is a cross-sectional view in elevation of the remote gaging apparatus with the rod withdrawn;

FIG. 2 is a view taken along the line II—II of FIG. 1;

FIG. 3 is a view taken along line III—III of FIG. 1;

DESCRIPTION OF THE PREFERRED EMBODIMENT

Figure 5:
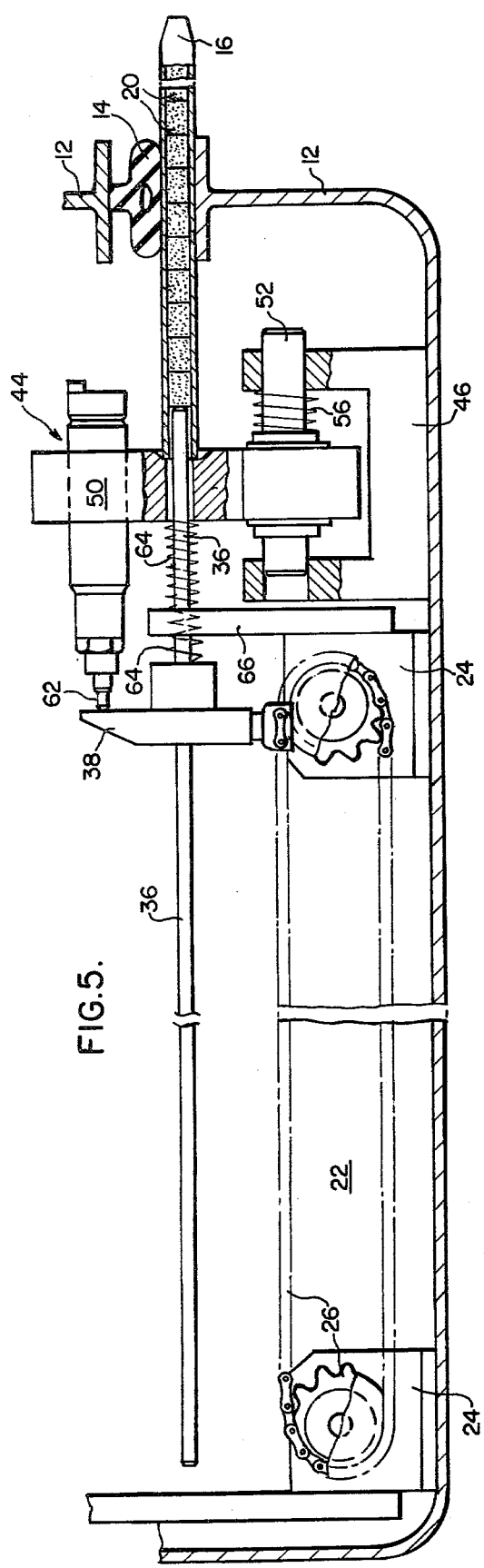
FIG. 5 is a cross-sectional view in elevation of the remote gaging apparatus with the rod in the fully inserted position.

The prior art concepts for determining the pellet stack length of plutonium fuel pellets in a nuclear fuel element involved separate manual operations performed in isolated glove-box enclosures. The invention described herein provides a remote gaging apparatus for measuring the pellet stack length and plenum length within a nuclear reactor fuel element without manual intervention.

Referring to FIGS. 1, 2, and 3, the remote gaging apparatus referred to generally as 10 comprises a housing 12 which serves to isolate the apparatus located therein from the atmosphere where working personnel may be present. Since the apparatus located within housing 12 may become contaminated with radioactive particles from substances such as plutonium, it is important that the interior of housing 12 be isolated from the exterior where working personnel may be present. A sealing arrangement 14 is located along one side of housing 12 that provides an opening through which a fuel element 16 may be inserted into housing 12. Sealing arrangement 14 may be an arrangement such as the one described in U.S. Pat. No. 4,070,240 issued Jan. 24, 1978 and entitled "Seal Containment System" by R. W. Kugler et al. and assigned to the assignee of the present application. Fuel element 16 comprises a cylindrical metallic sheath 18 with cylindrical nuclear fuel pellets 20 disposed therein in a manner well understood by those skilled in the art. Sealing arrangement 14 provides a mechanism whereby an open end of fuel element 16 may be introduced into housing 12 while isolating the radioactive material such as fuel pellets 20 from working personnel surrounding housing 12. A drive mechanism 22 is disposed in housing 12 and arranged near the open end of fuel element 16. Drive mechanism 22 comprises a mounting 24 with a continuous roller chain-sprocket arrangement 26 mounted thereon. Drive mechanism 22 also comprises a motor 28 supported by a vertical support 30 which in turn is attached to mounting 24. Motor 28 which may be a rotary vane air motor chosen from those well known in the art is attached to roller chain-sprocket arrangement 26 by a drive line 32 which is attached to axle 34 that extends through and into contact with roller chain-sprocket arrangement 26. When activated, motor 28 drives drive line 32 which in turn drives the roller chain-sprocket arrangement 26. A rod 36 is horizontally disposed within housing 12 in collinear alignment with fuel element 16 and has a stop 38 attached thereto. Stop 38 is also attached to roller chain-sprocket arrangement 26 such that when roller chain-sprocket arrangement 26 is advanced toward fuel element 16 stop 38 and rod 36 are also advanced toward fuel element 16. A first horizontal support 40 and a second horizontal support 42 are attached at one end to vertical support 30 and are arranged in the same plane as rod 36. First horizontal support 40 and second horizontal support 42 are slidably disposed through stop 38 so as to guide rod 36 and stop 38. A measuring mechanism 44 is also disposed in housing 12 between rod 36 and fuel element 16. Measuring mechanism 44 may comprise a base 46, a vertical member 48 and a linear variable differential transformer 50 mounted horizontally on vertical member 48. Vertical member 48 is slidably mounted on a first horizontal pin 52 and a second horizontal pin 54 with each of the horizontal pins being disposed in base 46. A first biasing mechanism 56 which may be a coil spring is mounted on first horizontal pin 52 between vertical member 48 and base 46 so as to urge vertical member 48 away from fuel element 16. A second biasing mechanism 58 (not shown) is likewise disposed on second horizontal pin 54. Vertical member 48 has a horizontal bore 60 therethrough which is in collinear alignment with rod 36 and fuel element 16. Horizontal bore 60 allows rod 36 to pass through vertical member 48 and into fuel element 16. Linear variable differential transformer 50 is arranged so as to be able to contact stop 38 when stop 38 is advanced towards fuel element 16. When stop 38 contacts linear variable differential transformer 50 it causes the armature 62 to be further inserted into linear variable differential transformer 50 which generates a signal corresponding to the length of travel of armature 62 in a manner well understood by those skilled in the art. Since stop 38 is firmly attached to rod 36, the advancement of stop 38 is the same as the advancement of rod 36 so that once stop 38 has contacted armature 62 the advancement of rod 36 and stop 38 may be determined by linear variable differential transformer 50 and displayed on visual equipment (not shown). Of course, linear variable differential transformer 50 may be replaced by another measuring device such as a rotary pulse generator chosen from those well known in the art and disposed in contact with rod 36 so as to indicate the advancement of rod 36. In addition, a third biasing mechanism 64 is disposed on rod 36 between vertical member 48 and stop 38 so as to urge vertical member 48 into contact with the open end of metallic sheath 18 thereby providing a plenum measurement referenced to the open end of fuel element 16.

OPERATION

Figure 4:
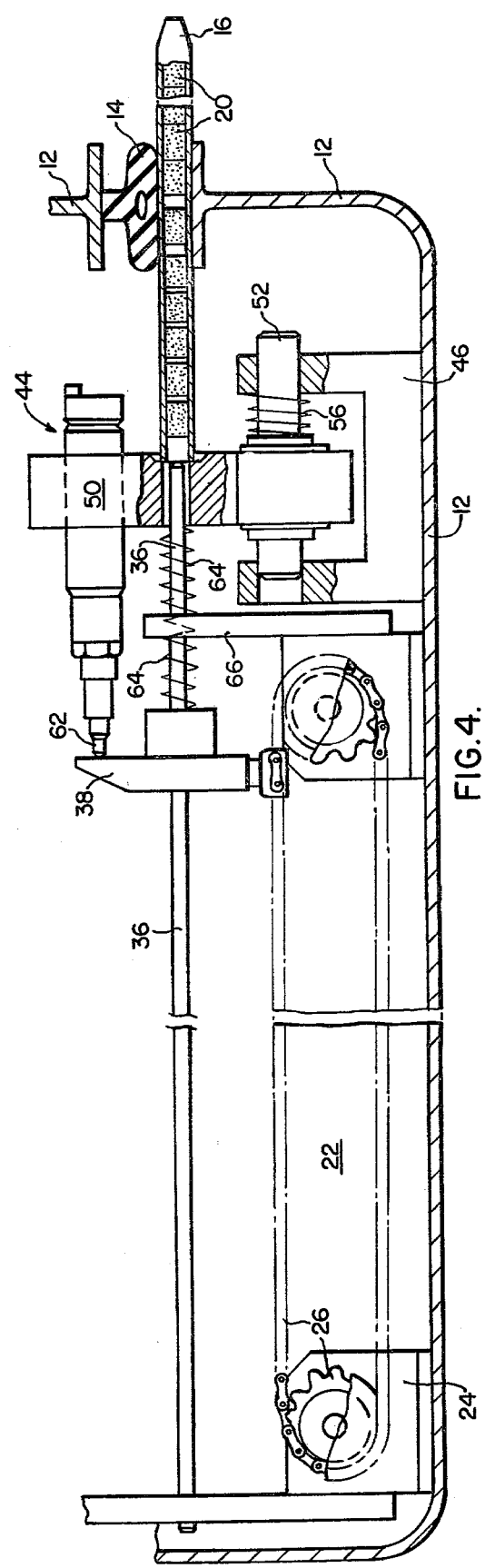
FIG. 4 is a cross-sectional view in elevation of the remote gaging apparatus with the stop contacting the measuring device.

During the loading of fuel elements such as during the process described in U.S. Pat. No. 4,070,240 issued Jan. 24, 1978 in the name of R. W. Kugler et al. and entitled "Seal Containment System" a fuel element 16 having fuel pellets 20 loosely disposed therein is inserted into housing 12 through sealing arrangement 14 as shown in FIG. 1. At this point it is necessary to remotely determine the length of the fuel pellet stack within metallic sheath 18. It is important to be able to determine with a high degree of accuracy the total length of the fuel pellet stack within metallic sheath 18 so as to be able to determine the reactivity corresponding to a given fuel assembly containing such a fuel element. Once fuel element 16 has been so sealed into housing 12, motor 28 is activated which causes drive line 32 to activate roller chain-sprocket arrangement 26. Because stop 38 is attached to roller chain-sprocket arrangement 26, when roller chain-sprocket arrangement 26 is advanced by the movement of drive line 32, stop 38 is advanced toward fuel element 16. Since stop 38 is attached to rod 36 the advancement of stop 38 by roller chain-sprocket arrangement 26 also causes rod 36 to be advanced toward fuel element 16. As stop 38 and rod 36 are advanced toward fuel element 16, stop 38 contacts third biasing mechanism 64. Remote gaging apparatus 10 is designed so that the resistance of third biasing mechanism 64 is greater than the total resistance of first biasing mechanism 56 and second biasing mechanism 58 such that when stop 38 contacts third biasing mechanism 64, linear variable differential transformer 50 and vertical member 48 are moved toward fuel element 16 by sliding along first horizontal pins 52 and second horizontal pin 54 until vertical member 48 contacts the open end of fuel element 16 as shown in FIG. 4. Linear variable differential transformer 50 is calibrated such that there is a zero reading when vertical member 48 first contacts fuel element 16 as shown in FIG. 4. When in the configuration as shown in FIG. 4, rod 36 passes through bore 60 and stops at the end of metallic sheath 18. As stop 38 and rod 36 are continued to be advanced toward fuel element 16, stop 38 also contacts armature 62 and begins to depress armature 62. As armature 62 is depressed by stop 38 rod 36 enters fuel element 16 as shown in FIG. 5. As rod 36 continues into fuel element 16, the leading end of rod 36 contacts the first fuel pellet 20 disposed within metallic sheath 18 and causes fuel pellets 20 to become tightly packed within metallic sheath 18. Once fuel pellets 20 have become tightly packed within fuel element 16, rod 36, stop 38, and consequently roller chain-sprocket arrangement 26 encounter stiff resistance. At this point a friction or magnetic clutch disposed within roller chain-sprocket arrangement 26 halts the advancement of roller chain-sprocket arrangement 26 and rod 36. At this point armature 62 has been depressed to its midpoint location and a visual readout is given which corresponds to the length of insertion of rod 36 within fuel element 16. Thus, the total length of insertion of rod 36 into metallic sheath 18 can be determined by remote gaging apparatus 10 as described herein. Since the overall length of fuel element 16 can be accurately measured prior to the loading of fuel pellets 20 therein, subtracting the total length of the insertion of rod 36 into fuel element 16 as determined by remote gaging apparatus 10 from the known total length of fuel element 16 yields the total length of the fuel pellet stack within fuel element 16. Should armature 62 be depressed less than or more than its midpoint location, a corresponding high or low reading will be given on the visual readout which would indicate that fuel element 16 is either over filled or under filled with fuel pellets 20. In addition, the length of insertion of rod 36 into fuel element 16 also indicates the unfilled plenum length within fuel element 16 with respect to the open end of the fuel element 16. Once this operation has been completed, a clutch (not shown) within roller chain-sprocket arrangement 26 is activated which allows first biasing mechanism 56, second biasing mechanism 58, and third biasing mechanism 64 to return stop 38 and rod 36 along with vertical member 48 and linear variable differential transformer 50 to their original positions where the process may be repeated on a different fuel element 16. Therefore, it can be seen that the invention provides a remote gaging apparatus for remotely measuring the pellet stack length within a nuclear reactor fuel element and also for determining the plenum length within such a fuel element.

I claim as my invention:

1. Remote gaging apparatus for remotely measuring the pellet stack length within a nuclear reactor fuel element comprising:
   a housing capable of having a nuclear fuel element inserted therein;
   support means for holding said fuel element in gaging position;
   a rod having a stop mounted thereon and disposed within said housing capable of being inserted into an open end of said fuel element for contacting nuclear fuel pellets in said fuel element and causing said fuel pellets to become tightly packed in said fuel element;
   drive means disposed within said housing and attached to said stop for selectively inserting said rod into said fuel element; and
   measuring means disposed within said housing and associated with said stop for contacting said stop when said rod is inserted into said fuel element thereby measuring the length of insertion of said rod in said fuel element with respect to said open end of said fuel element.

2. The remote gaging apparatus according to claim 1 wherein said measuring means comprises:
   a linear variable differential transformer mounted on said housing adjacent said stop for contacting said stop when said rod is inserted into said fuel element thereby measuring the length of insertion of said rod in said fuel element.

3. The remote gaging apparatus according to claim 2 wherein said measuring means further comprises:
   a base disposed in said housing;
   a horizontal member slidably disposed in said base;
   a vertical member supported by said horizontal member and attached to said linear variable differential transformer for supporting said linear variable differential transformer; and
   a first biasing means mounted between said horizontal member and said base for urging said linear variable differential transformer away from said fuel element.

4. The remote gaging apparatus according to claim 3 wherein said vertical member has a hole therein for allowing the passage of said rod therethrough.

5. The remote gaging apparatus according to claim 4 wherein said apparatus further comprises a second biasing means disposed on said rod for contacting said stop and urging said vertical member toward said fuel element.

6. The remote gaging apparatus according to claim 5 wherein said drive means comprises:
   a continuous motor driven chain attached to said stop for inserting and withdrawing said rod from said fuel element.

7. The remote gaging apparatus according to claim 6 wherein said apparatus further comprises:
   sealing means disposed on said housing for allowing the insertion and withdrawal of said fuel element while sealing said housing.

* * * * *